United States Patent [19]

Kretschmer

[11] 3,970,346

[45] July 20, 1976

[54] FASTENING ARRANGEMENT FOR DECORATIVE WHEEL TRIM

[75] Inventor: Paul Kretschmer, Waldaschaffe, Germany

[73] Assignee: Ymos-Mettalwerke, Germany

[22] Filed: Jan. 24, 1975

[21] Appl. No.: 543,971

Related U.S. Application Data

[63] Continuation of Ser. No. 443,520, Feb. 19, 1974, abandoned.

[52] U.S. Cl.............................. 301/37 R; 301/37 P; 24/73 HC
[51] Int. Cl.²........................................... B60B 7/00
[58] Field of Search............... 301/37 R, 37 B, 37 P, 301/37 C, 37 TP; 24/73 B, 73 R, 73 SC, 73 HC

[56] References Cited

UNITED STATES PATENTS

| | | | |
|---|---|---|---|
| 2,761,188 | 9/1956 | Bedford............................ | 24/73 HC |
| 3,771,834 | 11/1973 | Kretschmer....................... | 301/37 P |
| 3,788,707 | 1/1974 | Connell............................. | 301/37 P |

*Primary Examiner*—Stanley H. Tollberg
*Assistant Examiner*—D. W. Keen
*Attorney, Agent, or Firm*—Harness, Dickey & Pierce

[57] ABSTRACT

This invention relates to a decorative wheel cover with resilient fastening clips disposed in retaining pockets for fastening the cover on an automotive vehicle wheel. Each clip has a resilient leg for fastening to the wheel, as well as a resilient section located in the pocket and secured therein.

9 Claims, 12 Drawing Figures

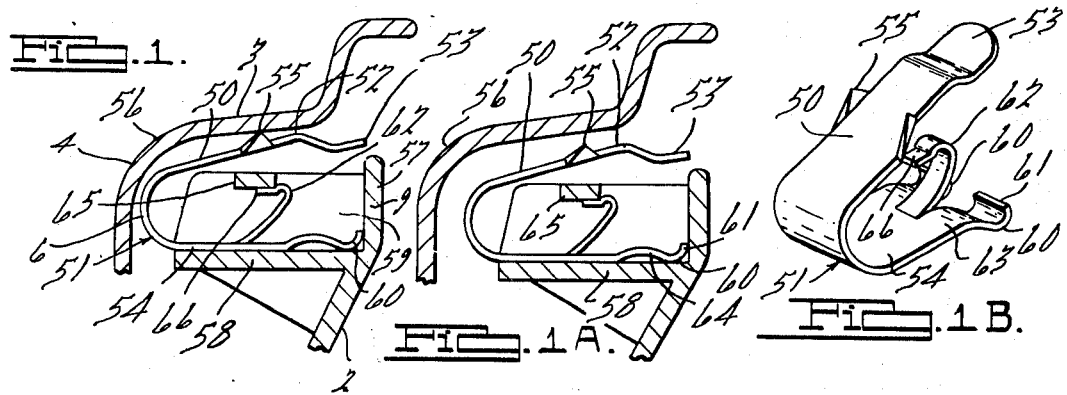
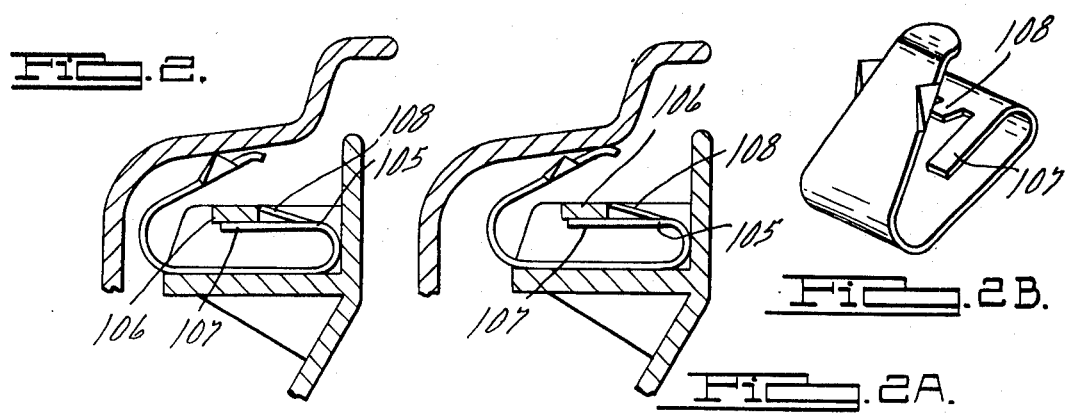
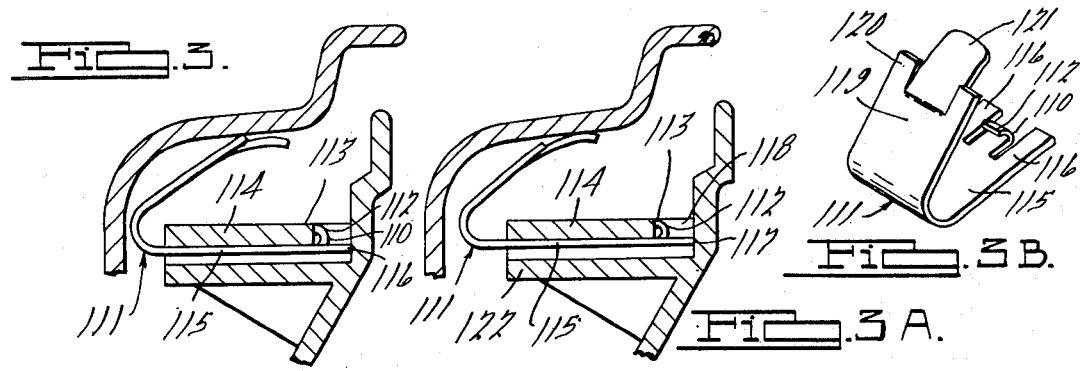
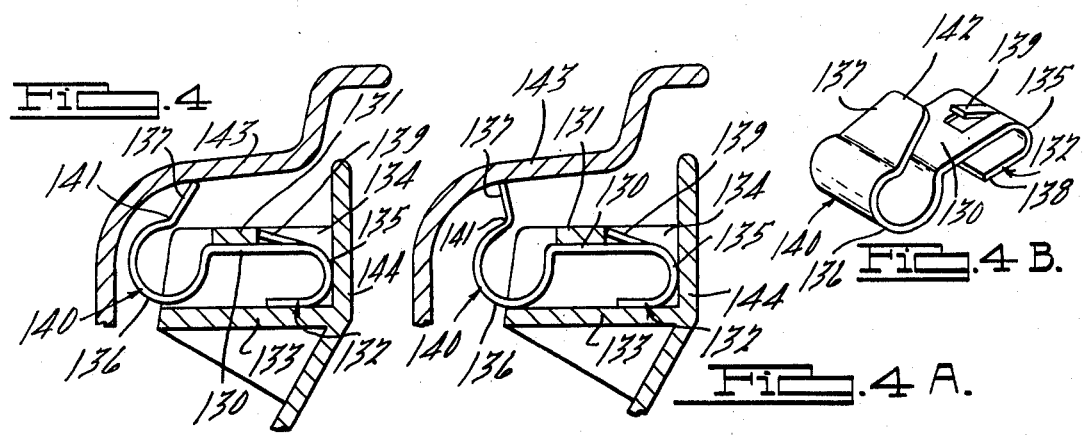

FASTENING ARRANGEMENT FOR DECORATIVE WHEEL TRIM

This is a continuation, of application Ser. No. 443,520, filed Feb. 19, 1974 now abandoned.

BACKGROUND OF THE INVENTION

Reference may be had to applicant's patent No. 3,771,834 and the reference patents cited therein to show some of the prior art. Difficulties have arisen in connection with certain known decorative wheel covers and their attachment to the vehicle wheel. Since these resilient fastening clips are easily bent when the wheel cover is removed, they cannot be used again. These resilient fastening clips must exert an accurately defined force to prevent the decorative wheel cover from being displaced with respect to the axis of rotation of the wheel in the course of travel. Furthermore, the resilient fastening clips must absorb substantial forces when traveling over poor sections of highway. In case the resilient fastening clip does not have the prescribed shape, the forces it can exert will not equal the specified values and therefore an inaccurate seating of the decorative wheel cover with associated imbalance and, finally, breaking of one or another resilient fastening clip results.

CROSS REFERENCE TO A RELATED APPLICATION

Reference may be had to application Ser. No. 437,473, now U.S. Pat. No. 3,873,161, filed Jan. 28, 1974 as a continuation of application Ser. No. 284,283, filed Aug. 28, 1972 now U.S. Pat. No. 3,788,707, and assigned to the assignee of the present invention which is now allowed.

SUMMARY OF THE INVENTION

The present invention provides resilient fastening clips disposed in securing recesses of the wheel cover and used to fasten the cover to the wheel. These resilient fastening clips make possible repeated disengagement of the wheel cover from the vehicle wheel without unacceptable deformation of the resilient fastening clips. The invention contemplates that the leg which emerges from the retaining pocket be fashioned with claws and at least one supporting nose at a distance from the claws. When installed, the claws constantly bite into the material of the vehicle wheel under spring action thus holding the decorative cover firmly to the wheel. If the wheel cover is to be released, it is merely necessary to pull it axially away from the wheel with a certain force. At the same time, the support noses at the free ends of the legs of the resilient fastening clips prevent the claws from digging further into the material of the vehicle wheel. As the result of this, the free ends of the legs do not fold over but remain usable. Preferably, these claws are folded-back parts near the free ends of the legs, while the support nose is displaced somewhat from the claws toward the free ends of the legs. The resilient fastening clips according to the invention are braced on the bridge-like part of each pocket. These, as well as other, features of the invention are brought out in the specification and the claims in conjunction with the drawings.

BRIEF DESCRIPTION OF THE DRAWING

FIG. 1 is a broken sectional view of a decorative wheel cover having securing recesses for resilient fastening clips provided with extending legs which bear against the flange of an automotive vehicle wheel to removably retain the cover thereon;

FIG. 1A is a view of the structure illustrated in FIG. 1 with the wheel cover released from the wheel;

FIG. 1B shows a perspective view of the resilient fastening clip according to FIGS. 1 and 1A;

FIGS. 2 to 2B are views, similar to FIGS. 1 to 1B, of another embodiment of the invention;

FIGS. 3 to 3B are views, as in FIGS. 1 to 1B, of still another embodiment of the invention, and FIGS. 4 to 4B are views, as in FIGS. 1 to 1B, of a still further embodiment of the invention.

DESCRIPTION OF THE PREFERRED EMBODIMENTS

In FIGS. 1 to 1B, a resilient fastening clip 51 is shown by means of which a decorative wheel cover 2 can be fastened to an outwardly diverging flange 3 of an automotive vehicle wheel 4 with the flange 3 having a slightly outwardly increasing conical form. The wheel cover 2 is disk shaped having an annular flange 57 with spaced recesses 59 provided radially thereof by pairs of spaced side walls which are connected at the top by a bridging member such as member 65 in the structure illustrated in FIG. 1A. A vertical flange 9 is provided at the outer edge of the wheel which closes the outer ends of the recesses 59 at the outer face of the cover. The resilient fastening clip 51, as in the other embodiments hereinafter described, is a spring strip bent or shaped according to the invention to provide a securing section 54 at one end of which is reversely curved at 6 forming an adjoining leg 50 which is disposed above the securing section 54. The leg 50 has a kink 52 serving as a contact nose located between and rearwardly of the claws 55. Beyond the kink 52 the leg 50 has an offset free end which serves as a release lever 53 for the claws 55. This lever 53 is offset toward the securing section 54 of the resilient fastening clip 51. If the lever is pushed down, the claws 55 are released from the diverging rim 56 and the wheel cover 57 can be removed without difficulty. The securing section 54 has two spaced base supports 60 which rest on the base 58 of the recess 59. These are bent concave and convex, and their free ends 61 point upwardly away from the base 58. A central struck-out finger 62 is curved upward from the root 63 between the supports 60 having a notch which catches behind the bridge member 65 which extends across the recess 59 with the end portion 66 extending therebeneath. The concave and convex conformation of the spaced base supports 60 enhances the resilient retaining force of the resilient fastening clip 51.

FIGS. 2 to 2B show an embodiment of the invention which substantially corresponds to the resilient fastening clip shown in FIGS. 1 to 1B. One difference is that the retaining leg 105 consists of two spaced parts 107 which engage the bottom of the bridge member 106 with the lanced out tongue 108 therebetween engaging the adjacent face of the bridge member.

The embodiment according to FIGS. 3 to 3B has a special feature in that the retaining leg 110 of a resilient fastening clip 111 is a reversely curved, struck out finger 112 having a small radius which, with its free end 113, bears against the bridge member 114 from behind and which preferably is disposed a short distance above the spring base portion 115 which rests upon spaced ribs 120 to permit the leg 110 to deflect downwardly therebetween. The base portion 115 has two supporting tongues 116 extending beyond the finger 112 to bear against the end wall 117 of the recess 118. The leg 119 has two struck out tabs 120 which serve as claws with the metal therebetween deflected downwardly to form a nose 121. At the bottom 122 of retaining pocket 118, there is a central groove 123 which permits the resilient finger 112 to deflect when being inserted in the retaining recess 118 beneath the bridge member 114.

In the embodiment shown in FIGS. 4 to 4B, the central portion of the spring strap 130 also bears against the underside of the bridge member 131, while the retaining leg 132 is braced against the cover flange 133 at the bottom of the recess 134. At both ends of the spring strap 130, there are curved sections 135 and 136 directed toward the flange 133 and bearing the legs 132 and 137, respectively. As illustrated in FIG. 4B, the retaining leg 132 consists of two spaced fingers 138 which rest flat on the bottom 133 and are directed from the curved section 135 toward the curved part 136. The spring strap 130 which bears against the bridge-like part 131 has a struck out retaining tongue 139 which slopes upwardly and catches behind the bridge member 131 to prevent the resilient fastening clip 140 from being pulled out of the recess 134. The radius of the curved piece 136 is so chosen that, when installed as shown in FIG. 4, it does not rest on the flange 133. Further, the curved section 136 is not tangential to the leg 137, instead, there is a kink 141 between the leg 137 and the curved section 136. The free end 142 of the leg 137 bears directly against the tapered rim 143 and, when the cover is to be removed, it swings from the position shown in FIG. 4 to that shown in FIG. 4A. As a result, the curved piece 136 is slightly deformed and becomes wedged between the flanges 133 and 143.

I claim:

1. In a fastening means for securing a decorative cover on the outer face of a vehicle wheel which has an outwardly diverging annular flange, said fastening means embodying an inwardly extending axial flange on said cover adapted to be aligned with and spaced from said wheel flange when the cover is applied to the wheel, means defining a plurality of spaced clip receiving recesses on said cover flange, each said recess being defined by an outer end wall and a pair of spaced side walls extending inwardly therefrom forming a recess which is open at its inner end, a bridge member having a plurality of walls engaging the side walls of the recess and spaced inwardly from the end wall providing an opening therebetween, a metal spring clip disposed within each of said recesses having a locking portion engaging the bottom of the recess and a wall of said bridge member with a lanced out finger extending into the opening having its end engaging the adjacent end of the bridge member to secure the locking portion of the clip within the recess with an end-to-end nonyielding abutment, and securing means supported by said locking portion for engagement with said wheel flange.

2. In a fastening means as recited in claim 1, wherein said securing means extends from the open end of the recess and is reversely formed to extend above the bridge member with cutting means engaging the diverging wall of the wheel.

3. In a fastening means as recited in claim 2, wherein a tab spaced forwardly of said securing means engages said diverging wheel flange near the outer edge thereof to retain the cutting means from contact therewith.

4. In a fastening means as recited in claim 1 having the locking means engaging the bottom of the recess and extending from said open end of the recess and reversely formed into said securing means.

5. In a fastening means as recited in claim 1, wherein said lanced out finger of said spring clip is disposed between side portions which are reversely bent to engage the under side of the bridge member.

6. In a fastening means as recited in claim 5, wherein said side portions of the secured means of the clip rests on the bottom of the recess to permit the end of the lanced out central section to engage the bridge member in nonyielding engagement therewith.

7. In a fastening means as recited in claim 1, wherein the securing means of the clip is a central cut-out portion forming a finger which is reversely bent to have end-to-end nondeflectable engagement with the bridge member with the ends of the portions at the sides of the finger engaging the outer end wall of the recesses to form the locking portion of said clip.

8. In a fastening means as recited in claim 1, wherein the locking portion which engages the bottom of the recess has the end portion lanced to form the finger with the end portion reversely curved for abutting the inner wall of the recess with the extending end engaging the bottom thereof.

9. In a fastening means as recited in claim 1, wherein the portion of the spring clip which engages the bottom of the recess has a lanced out finger, the front portion of which is reversely bent to engage the inner edge of the bridge member when the front of the side portions engage the closed end of the recess.

* * * * *